United States Patent [19]

True et al.

[11] Patent Number: 5,901,212
[45] Date of Patent: May 4, 1999

[54] APPARATUS FOR BLOCKING VOICE BAND SIGNALS WHEN RECEIVING CALLER IDENTIFICATION INFORMATION FOR A WAITING CALL

[75] Inventors: Robert Clair True, McCordsville; Brian Albert Wittman, Indianapolis, both of Ind.

[73] Assignee: Lucent Technologies Inc., Murray Hill, N.J.

[21] Appl. No.: 08/794,722

[22] Filed: Feb. 3, 1997

[51] Int. Cl.[6] .................................................... H04M 1/57

[52] U.S. Cl. ...................... 379/215; 379/93.35; 379/127; 379/142

[58] Field of Search ................................ 379/215, 93.35, 379/382, 377, 372, 373, 142, 127

[56] References Cited

U.S. PATENT DOCUMENTS

| | | | |
|---|---|---|---|
| 4,451,706 | 5/1984 | Boeckmann | 379/421 |
| 5,263,084 | 11/1993 | Chaput et al. | 379/421 |
| 5,287,401 | 2/1994 | Lin | 379/93.35 |
| 5,649,002 | 7/1997 | Brady et al. | 379/215 |
| 5,651,060 | 7/1997 | Cohn et al. | 379/93.35 |
| 5,768,367 | 6/1998 | Westergaard et al. | 379/142 |

*Primary Examiner*—Scott Wolinsky

[57] ABSTRACT

An improved caller identity on call waiting unit permits caller identification signals to be received without changing the direct current state of a customer telephone station. This is accomplished by using a capacitor/inductor circuit with appropriate bypass to accomplish the function of blocking voice band signals to and from the station. Advantageously, such an arrangement avoids the problem of falsely disconnecting calls on hold.

5 Claims, 1 Drawing Sheet

APPARATUS FOR BLOCKING VOICE BAND SIGNALS WHEN RECEIVING CALLER IDENTIFICATION INFORMATION FOR A WAITING CALL

TECHNICAL FIELD

This invention relates to methods and apparatus for receiving caller identification information on call waiting calls.

Problem

Caller identification has quickly become a popular feature because it allows customers to identify the telephone number, and, more recently, even the name, of a caller. More recently, caller identification has been extended to cover incoming calls to a busy line having the call waiting feature, a feature which allows the terminating line to receive a waiting call even though it is busy on another call. In such a case, the terminating user receives a signal indicating a waiting call and, by flashing the switch hook of the terminating station, is able to switch temporarily to the waiting call, and, by repeated flash signals is able to go back and forth between the waiting call and the original call. Usually, of course, one of these calls is fairly quickly disconnected, possibly to be resumed at a later time.

The reasons why caller identification is desirable on regular terminating calls is equally applicable to waiting calls. A user may simply choose to ignore a waiting call if it is not from a source that is in some way important to the terminating user. A standard set of signals has been defined for communicating from the terminating switch to users who have the caller identification on call waiting feature. The feature is implemented by supplying a display and control unit to each telephone station for which a display is wanted. (The method allows for arrangements wherein only some of the telephone extensions are equipped with a caller identification display.) A prompting signal is sent from the central office (switch) to the user stations. These stations respond with an acknowledgement and arrange to mute, i.e., essentially block signals to the telephone station connected to the display during the time that the identification information is transmitted from the switch. This blocking serves two purposes: it prevents the terminating user from hearing the data signals which carry the caller identification information, and it prevents speech signals generated by the user from interfering with the data signal received from the central office and causing the data signal representing the caller identification to be garbled.

In the prior art, the blocking is accomplished by temporarily disconnecting the telephone station from the incoming line to the switch and connecting only the caller identification equipment during the time that the caller identification information is received. In one of the prior art arrangements this disconnection is accompanied by maintaining power across the disconnected telephone station, although in other arrangements, no such power is supplied during the time that the caller identification information is being received. A problem of the prior art is that this blocking arrangement causes some calls which are temporarily on hold to be disconnected. The hold detection circuitry is sensitive to any changes of voltage and is likely to interpret such changes as a disconnect if they persist for more than a few hundred milliseconds.

A problem of the prior art therefore is that there is no fully satisfactory arrangement for receiving caller identification information on call waiting without the risk of a false disconnect being generated.

Solutions

The above problem is solved and an advance made over the prior art in accordance with this invention wherein the blocking or muting function is performed, during the exchange of signals between a switch and a caller identification display and control on call waiting, by blocking voice band signals to the telephone station during the muting interval without changing the telephone station's supervisory and powering arrangement; the path to the caller identification display control circuitry is maintained during the muting interval. Advantageously, no extended direct current signals are sent either to the switch, or to the telephone station and its key system control circuitry if the telephone station is part of a key system.

DETAILED DESCRIPTIONS

Figure 1:
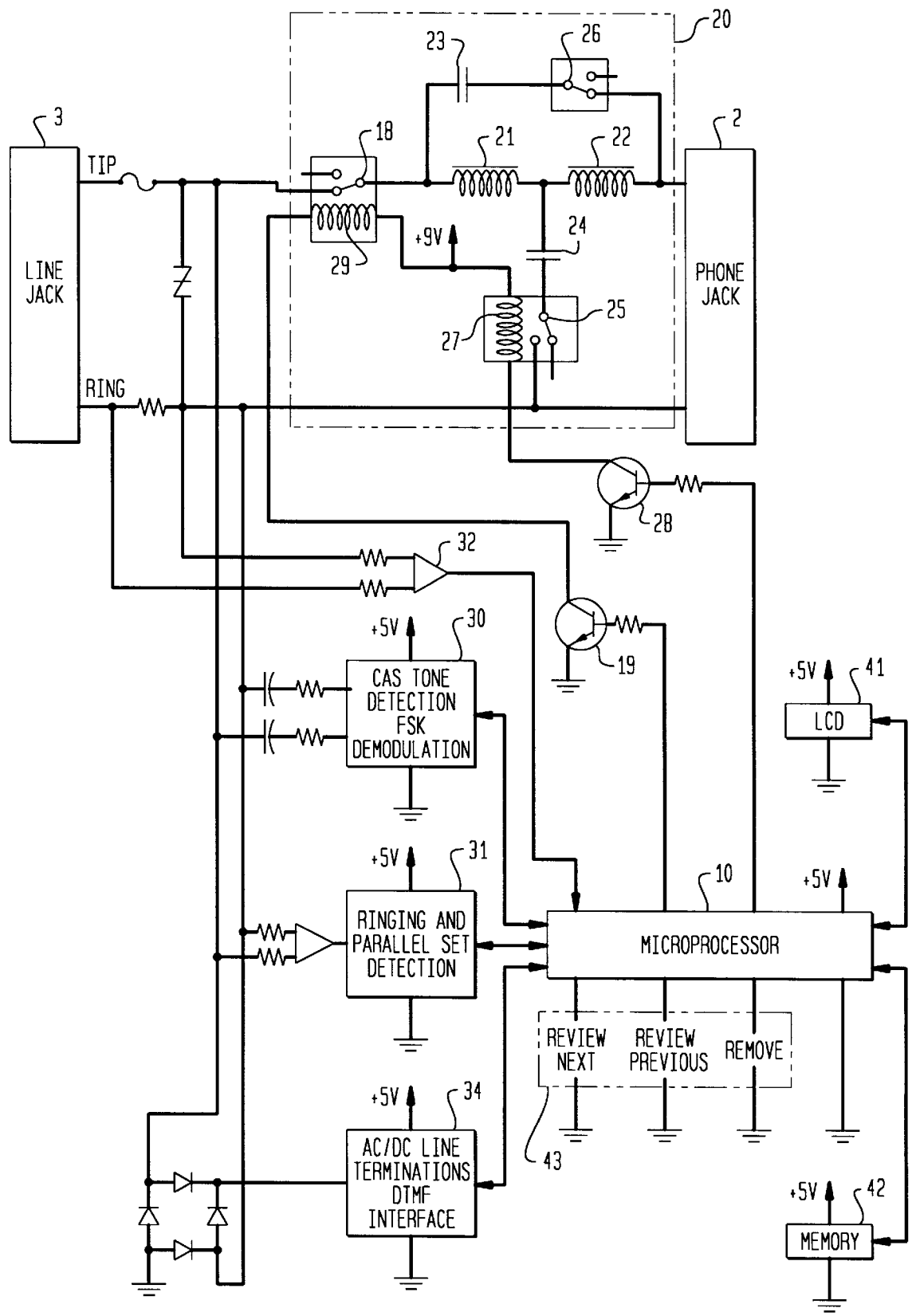
FIG. 1 is a block diagram of an interface unit for receiving caller identification information on call waiting calls.

FIG. 1 is a diagram of a caller identity on call waiting unit. Such a unit is interposed between an incoming line having appearance at a line jack 3 and a telephone station having an appearance at phone jack 2. A microprocessor 10, provided with an auxiliary memory 42 serves to control the unit. The microprocessor has an output to drive an alphanumeric liquid crystal display 41. An array of buttons 43 is used by the customer to signal to the microprocessor in order to control information on the display. Interposed between the line jack and the phone jack is a blocking circuit 20 which has two states and is switched between the two states by two contacts, 25 and 26, controlled by a relay coil 27 that is under the control of microprocessor 10. In a blocking state, series connected inductors 21 and 22 are bypassed by capacitor 23 and relay contact 26, and an essentially unattenuated voice signal is passed to the telephone handset. In a non-blocking state, the inductors 21 and 22 are not bypassed by capacitor 23, but instead the output of inductor 21 is connected by bypass capacitor 24 and relay contact 25 to the other side of the line, thus heavily attenuating and, essentially, blocking all voice band signals to the telephone handset without changing the direct current state, i.e., the detectable state representing the amount of direct current passing through the telephone set. The two relay contacts which control the change of state described above are contacts 25 and 26 controlled by relay coil 27 which is driven by driver 28 controlled by microprocessor 10.

In applicants' preferred embodiment, inductors 21 and 22 are 500 and 3.3 millihenries respectively, and capacitors 23 and 24 are 47 and 330 microfarads, respectively. Frequency Shift Keyed (FSK) demodulation and tone detection circuit 30 is used to permit the microprocessor to monitor all voice band signals coming from the central office switch. The actual circuit 30 has an output representing the state of the prompting (CAS) (Customer Premises Equipment Alerting Signal) signal, and another representing the demodulated FSK signals. The microprocessor monitors these signals and detects the presence of the prompting signal from the central office.

Circuit 32 detects whether the local telephone connnected to the phone jack is in use. Detection circuit 31 detects when any station connected to the line is in use, and detects ringing on the line. The microprocessor accepts the signals from units 31 and 32 as control signals and receives data derived from demodulated voice band signals from unit 30 in order to detect the CAS tone and caller identification data. The microprocessor processes these signals and uses them to control the driver and display 41. In addition, the microprocessor accepts control signals from the buttons 43 for further controlling the LCD display.

The caller identity on call waiting unit operates in substantially the same way as prior art devices except for the different blocking or muting arrangement. The microprocessor constantly monitors for a dual tone CAS prompting signal. It is assumed herein that only one station on a line is equipped with a call waiting caller identification unit. In response to the prompting signal, the microprocessor checks whether the connected telephone is off-hook via detector 32 and also checks whether other telephones are off-hook via detection circuit 31. If any other telephones are off-hook, this is detected in the following way: In response to the CAS prompt, and under the control of the microprocessor, a very brief interval of open circuit (not long enough to trip hold signals) is inserted in the circuit from the line to the telephone station by operating relay coil 29 and its associated contact 18 under the control of driver 19. Such a brief open interval will not be inserted by any other off-hook station. Therefore if there is any such off-hook telephone station on the line, it will be detected because there will be only a small change in the output of line voltage detection circuit 31. If any other station is off-hook, i.e., if voltage detection circuit 31 detects only a small change, then the call waiting caller identification cannot be used because no muting arrangement is available on the other station that is off-hook and therefore no acknowledgement of the prompting tone is sent.

If this is not the case, then the identification can be received. A first acknowledgement signal, a DTMF signal corresponding to the fourth column and fourth row of DTMF signals, is transmitted to the switch. In response to the first acknowledgement signal, the switch transmits the identification information as a series of FSK signals detected by circuit 30. When the information has been received, it is acknowledged by the caller identification on call waiting unit with a second DTMF acknowledgement signal. As soon as the prompting tone is detected, the muting circuit is switched into place and retained during the time that the microprocessor is receiving the signals carrying the caller identification information. When the blocking circuit 20 is in the muting state, all voice band signals to the telephone handset are sharply attenuated, but the direct current signals to that station are unaffected. Following receipt of the caller identification information, and following the transmission back to the switch of a second acknowledgement signal the microprocessor controls the change of the muting circuit to its normal state, thus allowing the telephone station to communicate.

We claim:

1. Apparatus for controlling the transmission of voice band signals over tip and ring leads of a telephone line, said apparatus inserted between a central office switch and a telephone station, said apparatus comprising:

means for receiving signals carrying caller identification information from said central office switch; and voice band signal blocking means for placing said apparatus in a blocking state such that voice band signals are not allowed to pass through said apparatus during a time period when said signals carrying caller identification information are being received, and for placing said apparatus in a non-blocking state such that voice band signals are allowed to pass through said apparatus outside of said time period, said blocking means comprising a network of inductor means and capacitor means, said capacitor means being selectively connectable to said telephone line to enable switching between said blocking state and said non-blocking state without changing a direct current state of said telephone line.

2. The apparatus of claim 1 wherein said capacitor means comprises:

a first selectively connected capacitor means for connecting a first capacitor in parallel with said inductor means only when said apparatus is placed in said non-blocking state; and a second selectively connected capacitor means for connecting a second capacitor between said inductor means and a first one of said tip and ring leads only when said apparatus is placed in said blocking state.

3. The apparatus of claim 2 wherein said inductor means comprises two inductors connected in series with a second one of said tip and ring leads.

4. The apparatus of claim 3 wherein a first lead of said first capacitor means is connected to a first one of said inductors connected in series, and a second lead of said first capacitor means is connected to a second one of said inductors connected in series only when said apparatus is placed in said non-blocking state.

5. The apparatus of claim 3 wherein a first lead of said second capacitor means is connected to a common junction point between said two inductors connected in series, and a second lead of said second capacitor means is connected to said first one of said tip and ring leads only when said apparatus is placed in said blocking state.

* * * * *